United States Patent
Jakab et al.

(10) Patent No.: US 11,725,539 B2
(45) Date of Patent: Aug. 15, 2023

(54) OIL STANDPIPE ASSEMBLY FOR SERVICING AND OIL LEVEL MAINTENANCE OF A STARTER IN A GAS TURBINE ENGINE

(71) Applicant: Hamilton Sundstrand Corporation, Charlotte, NC (US)

(72) Inventors: Thomas Jakab, Lake Geneva, WI (US); Jordan Pugliese, Woodstock, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/243,277

(22) Filed: Apr. 28, 2021

(65) Prior Publication Data
US 2022/0025781 A1 Jan. 27, 2022

Related U.S. Application Data

(60) Provisional application No. 63/057,045, filed on Jul. 27, 2020.

(51) Int. Cl.
*F01D 25/18* (2006.01)
*F02C 7/06* (2006.01)

(52) U.S. Cl.
CPC ............... *F01D 25/18* (2013.01); *F02C 7/06* (2013.01); *F05D 2220/32* (2013.01); *F05D 2260/85* (2013.01); *F05D 2260/98* (2013.01)

(58) Field of Classification Search
CPC .. F01D 25/18; F02C 7/06; F02C 7/277; F02C 7/32; F05D 2220/32; F05D 2260/85; F05D 2260/98; F05D 2220/50; F05D 2260/602

USPC .......................................................... 415/175
See application file for complete search history.

(56) References Cited

U.S. PATENT DOCUMENTS

| | | | |
|---|---|---|---|
| 4,589,524 A * | 5/1986 | Laycock | F01M 11/04 184/103.1 |
| 4,856,273 A | 8/1989 | Murray | |
| 7,367,427 B2 | 5/2008 | Gaines et al. | |
| 9,422,979 B2 | 8/2016 | Hochstetler et al. | |

(Continued)

FOREIGN PATENT DOCUMENTS

EP 2793372 A2 10/2014

OTHER PUBLICATIONS

Extended European Search Report dated Jan. 5, 2022, received for corresponding European Application No. 21188075.2, pp. 7.

*Primary Examiner* — Yi-Kai Wang
(74) *Attorney, Agent, or Firm* — Kinney & Lange, P.A.

(57) ABSTRACT

A standpipe assembly configured to connect to a starter that includes a housing is described herein. The standpipe assembly includes: a standpipe having first and second openings at opposite ends of a hollow passageway, wherein the standpipe, upon being connected to the starter, is oriented within the housing so that the standpipe drains oil through the standpipe when oil in the housing reaches an overfill level, and is oriented in parallel to internal oil flow in the starter to inhibit interference with the internal oil flow during operation of the starter; and an attachment portion, wherein the attachment portion is structured to attach the standpipe assembly to the housing of the starter and prevent movement of the standpipe assembly with respect to the housing of the starter.

20 Claims, 10 Drawing Sheets

(56) References Cited

U.S. PATENT DOCUMENTS

2005/0191166 A1    9/2005   Farnsworth et al.
2014/0306564 A1*  10/2014   Hochstetler .............. H02K 5/22
                                                         310/90

* cited by examiner

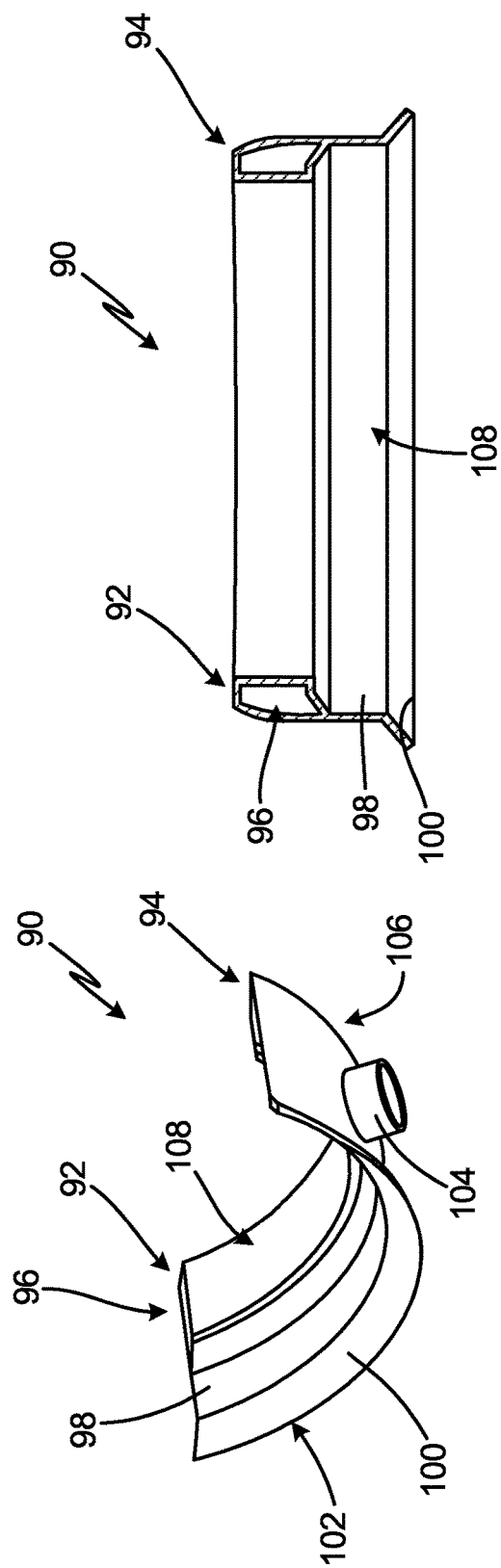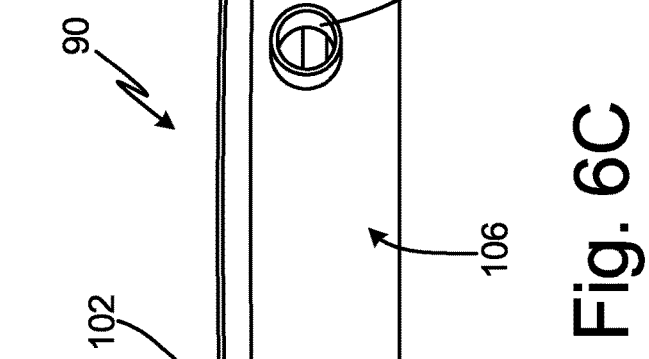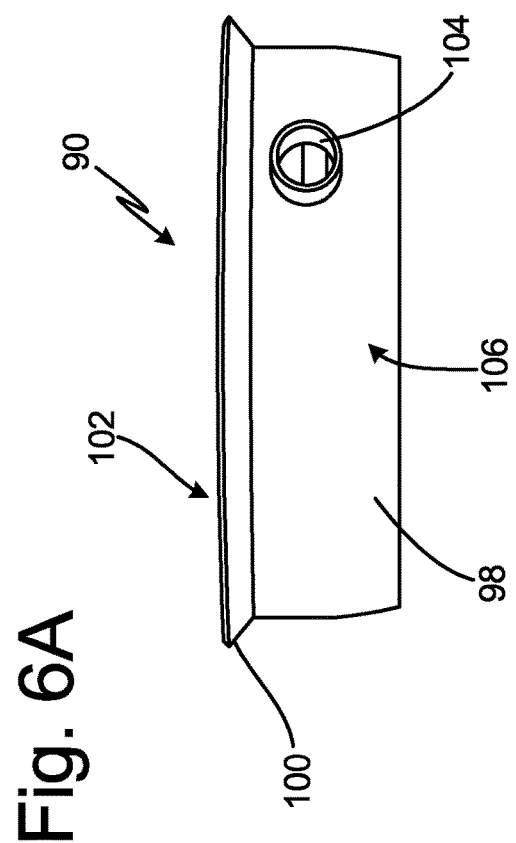

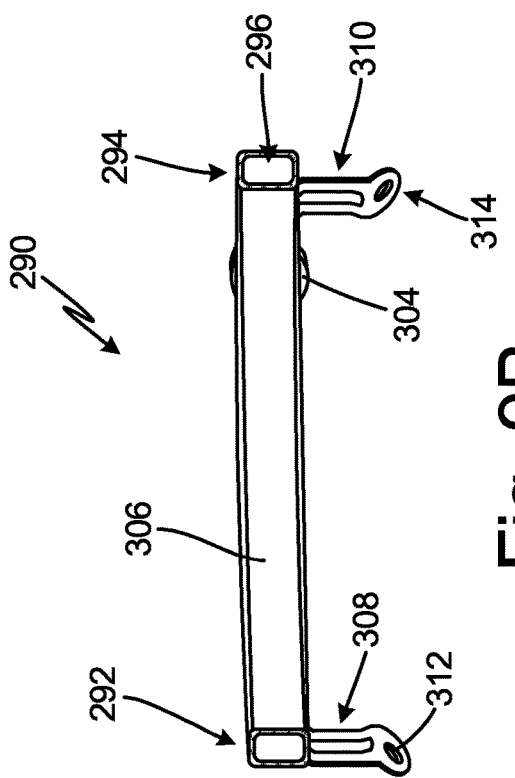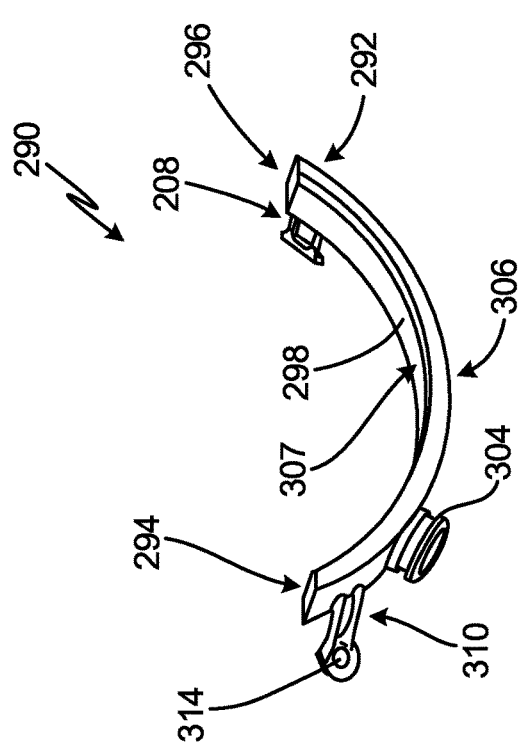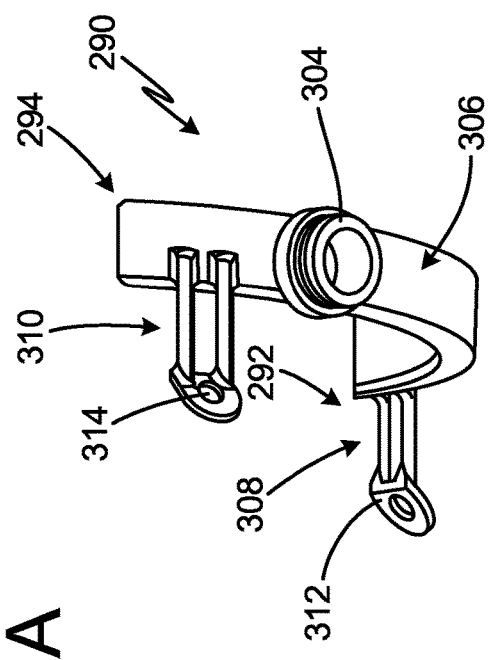

OIL STANDPIPE ASSEMBLY FOR SERVICING AND OIL LEVEL MAINTENANCE OF A STARTER IN A GAS TURBINE ENGINE

BACKGROUND

The present disclosure relates to rotating, mechanical machines such as high-speed starters for gas turbine engines and, more particularly, to a standpipe for improved oil servicing and oil level maintenance in a starter. Gas turbine engines, for an aircraft, for example, may include various types of rotating, mechanical machines such as, for example, motors, and starters.

The starter components are enclosed within a housing. The housing also contains starter components and lubricating fluid to lubricate the starter components. Oil level can be controlled by a standpipe assembly, which is typically formed integral to the housing. When preparing to start or service a starter, lubricating fluid is poured into the housing. Once lubricating fluid has reached a level even with a top of the standpipe assembly (i.e., just below an overfill level), the lubricating fluid starts to drain through the standpipe assembly, indicating that the starter is ready for operation.

SUMMARY

A standpipe assembly configured to connect to a starter that includes a housing is described herein. The standpipe assembly includes: a standpipe having first and second openings at opposite ends of a hollow passageway, wherein the standpipe, upon being connected to the starter, is oriented within the housing so that the standpipe drains oil through the standpipe when oil in the housing reaches an overfill level, and is oriented in parallel to internal oil flow in the starter to inhibit interference with the internal oil flow during operation of the starter; and an attachment portion, wherein the attachment portion is structured to attach the standpipe assembly to the housing of the starter and prevent movement of the standpipe assembly with respect to the housing of the starter.

A starter is described herein. The starter includes: a housing that includes a first aperture to receive oil and a second aperture to allow the oil to flow out of the housing; and a standpipe assembly comprising: a standpipe having first and second openings at opposite ends of a hollow passageway, wherein the standpipe, upon being connected to the starter, is oriented within the housing so that the standpipe drains oil through the standpipe and the second aperture of the housing when oil in the housing reaches an overfill level, and is oriented in parallel to internal oil flow in the starter to inhibit interference with the internal oil flow during operation of the starter; and an attachment portion, wherein the attachment portion is structured to attach the standpipe assembly to the housing and prevent movement of the standpipe assembly A method of installing a standpipe assembly in a starter including a housing is described herein. The standpipe assembly comprises a hollow passageway having first and second openings at opposite ends and a drain. The method includes the steps of: aligning the standpipe assembly within the housing, wherein the hollow passageway is oriented in parallel to internal oil flow in the starter to inhibit interference with the internal oil flow during operation of the starter; positioning the standpipe assembly within the housing of the starter, wherein the drain of the standpipe is adjacent a gravity drain port in the housing and the first opening and second opening are located at or below an overfill level such that oil drains through the standpipe and out the drain when oil in the housing reaches the overfill level during servicing of the starter; and securing the standpipe assembly to the housing.

BRIEF DESCRIPTION OF THE DRAWINGS

FIG. 6A is a perspective view of the retrofit standpipe assembly of FIG. 4;

FIG. 6B is a top view of the retrofit standpipe assembly of FIG. 4;

FIG. 6C is a bottom view of the retrofit standpipe assembly of FIG. 4;

FIG. 9A is a perspective view of the redesigned standpipe assembly of FIG. 7;

FIG. 9B is a top view of the retrofit standpipe assembly of FIG. 7;

FIG. 9C is another perspective view of the redesigned standpipe assembly of FIG. 7.

DETAILED DESCRIPTION

An improved retrofit oil standpipe assembly, improved redesigned oil standpipe assembly, and improved method of installing a standpipe assembly in a starter for a gas turbine engine are described herein. The improved oil standpipe assembly is designed to be separate from a starter housing, as opposed to be integrally cast or machined as with existing designs. The improved design can include a retrofit configuration to provide a second (or dual) path for oil return to a drain fitting in an existing starter, and can be complimentary to the existing standpipe for drainage purposes. In addition, the second path or added, retrofit standpipe assembly can be oriented in parallel to internal oil flow in the starter to inhibit interference with internal oil flow during operation of the starter (rather than having the orientation of the existing standpipe, which is not parallel to the path of oil through the starter during operation). Alternatively, the oil standpipe assembly can include a redesigned configuration to provide a less restrictive path (i.e., a larger cross-section through which oil may flow) for oil return to a drain fitting for a starter. In addition, the redesigned standpipe assembly can also be oriented in parallel to internal oil flow in the starter to inhibit interference with internal oil flow during operation of the starter. The improved standpipe assemblies can increase the rate of gravity drain through the starter when being serviced, thereby lowering the risk of over-servicing, or overfilling, the starter. During operation of the engine, the improved standpipe assemblies do not interfere with oil movement through the starter by being oriented in parallel to the movement of oil through the starter during operation of the motor or engine. Also, during operation of the engine, the gravity drain is closed or plugged such that the improved standpipe assemblies do not allow for draining from the starter during operation. In addition, if an aircraft banks sharply during flight, for example, no oil will drain from the starter when the plug is included.

Figure 1:
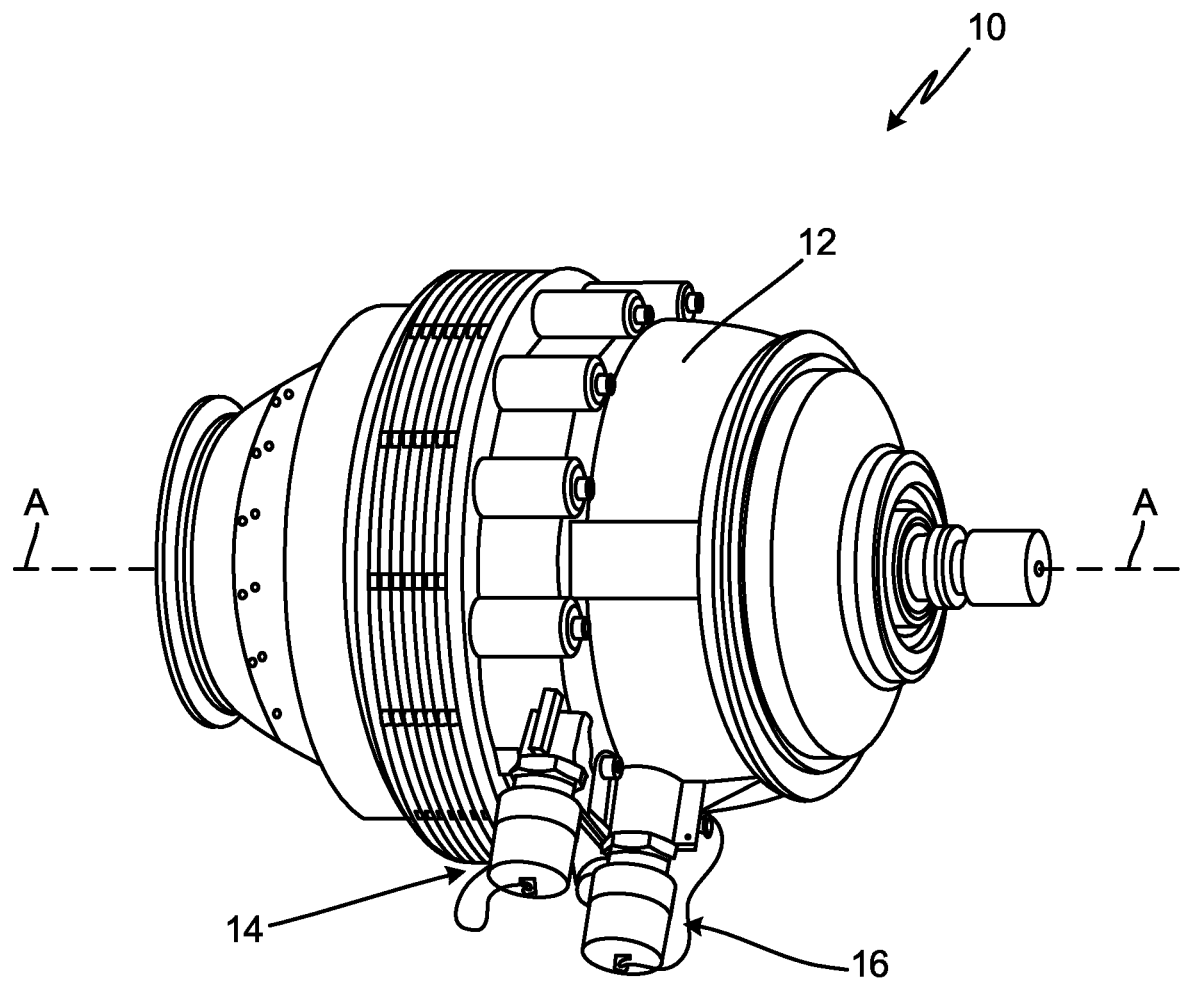
FIG. 1 is a perspective view of a starter.

FIG. 1 is a perspective view of starter 10 illustrating housing 12 of starter 10. Housing 12 includes fill aperture 14, which may also be referred to as a pressure fill fitting, a gravity fill aperture, a pressure fill aperture, a gravity fill fitting or a first aperture, and which is configured to fill starter 10 with oil during servicing. The fill aperture 14 may utilize any suitable filling method or aperture in order to add oil to starter 10. Housing 12 further includes drain aperture 16, which may also be referred to as a gravity drain aperture, a gravity drain fitting, a drain fitting or a second aperture, and which is configured to drain the oil added during servicing that goes above an overfill line or level in starter 10. Starter 10, during operation of an engine into which starter 10 is incorporated, rotates about axis A, which is shown extending axially through starter 10. Oil inside starter 10 will also rotate around axis A during engine operation. Starter 10 shown is one example of a starter that is the subject of the present disclosure, but other suitable starters are also contemplated.

Figure 2:
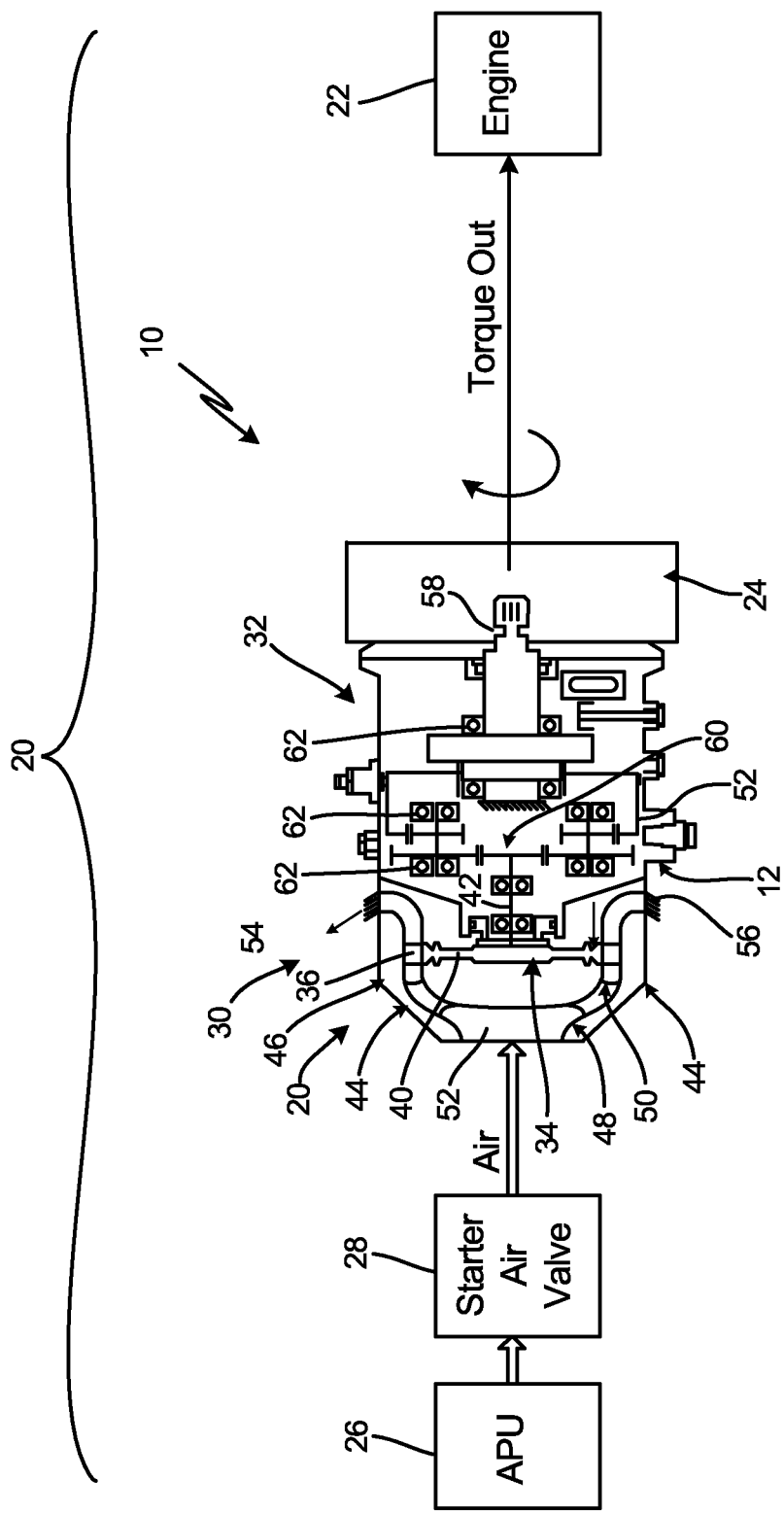
FIG. 2 is a schematic block diagram of an embodiment of a control system including an embodiment of the starter of FIG. 1.

FIG. 2 schematically illustrates a gas turbine engine start system 20 for use with, or including, starter 10, which is an Air Turbine Starter (ATS). Starter 10 is operable to initiate spool-up of larger gas turbine engine 22 through accessory gearbox 24. Starter 10 can be powered by high pressure air from, for example, auxiliary power unit (APU) 26 that can selectively communicate through starter air valve 28. It should be appreciated that high pressure air may be alternatively, or additionally, sourced from a second propulsion gas turbine engine typical of a multi-engine aircraft, or from a ground cart, for example.

Starter 10 generally includes housing assembly 12 and can, for example, include turbine section 30 and output section 32. Turbine section 30 can include turbine wheel 34 with a plurality of turbine blades 36, hub 40, and turbine rotor shaft 42. Turbine blades 36 of turbine wheel 34 can be located downstream of inlet housing assembly 44 (that includes inlet assembly 46 and nozzle assembly 48). Nozzle assembly 48 can include a plurality of vanes 50 to direct compressed airflow from inlet 52 to drive turbine wheel 34. The air can then be exhausted through flow path 54 and exhaust baffles 56.

Turbine wheel 34 can be driven by high pressure air such that turbine rotor shaft 42 mechanically drives starter output shaft 58 though gear system 60, such as a planetary gear system. Turbine rotor shaft 42, starter output shaft 58 and gear system 60 can be supported upon bearings 62. Starter 10 thereby can transmit relatively high loads through gear system 60 to convert pneumatic energy from high pressure air into mechanical energy to, for example, rotate gas turbine engine 22 for spool-up.

System 20 is one example of a gas engine start system that may be used as a starter for a gas turbine engine in aircraft, space, marine, land or other vehicle-related applications where gas turbine engines are used. For aircraft applications, gas turbine engines are used for propulsion (e.g., the aircraft's main engines) and/or power (e.g., the APU). It is to be appreciated, however, that the present invention is not limited to use in conjunction with a specific type of mechanical machine. Thus, although the present invention is, for convenience of explanation, depicted and described as being implemented in a starter, it will be appreciated that it can be implemented in other mechanical machines than those described herein.

Figure 3:
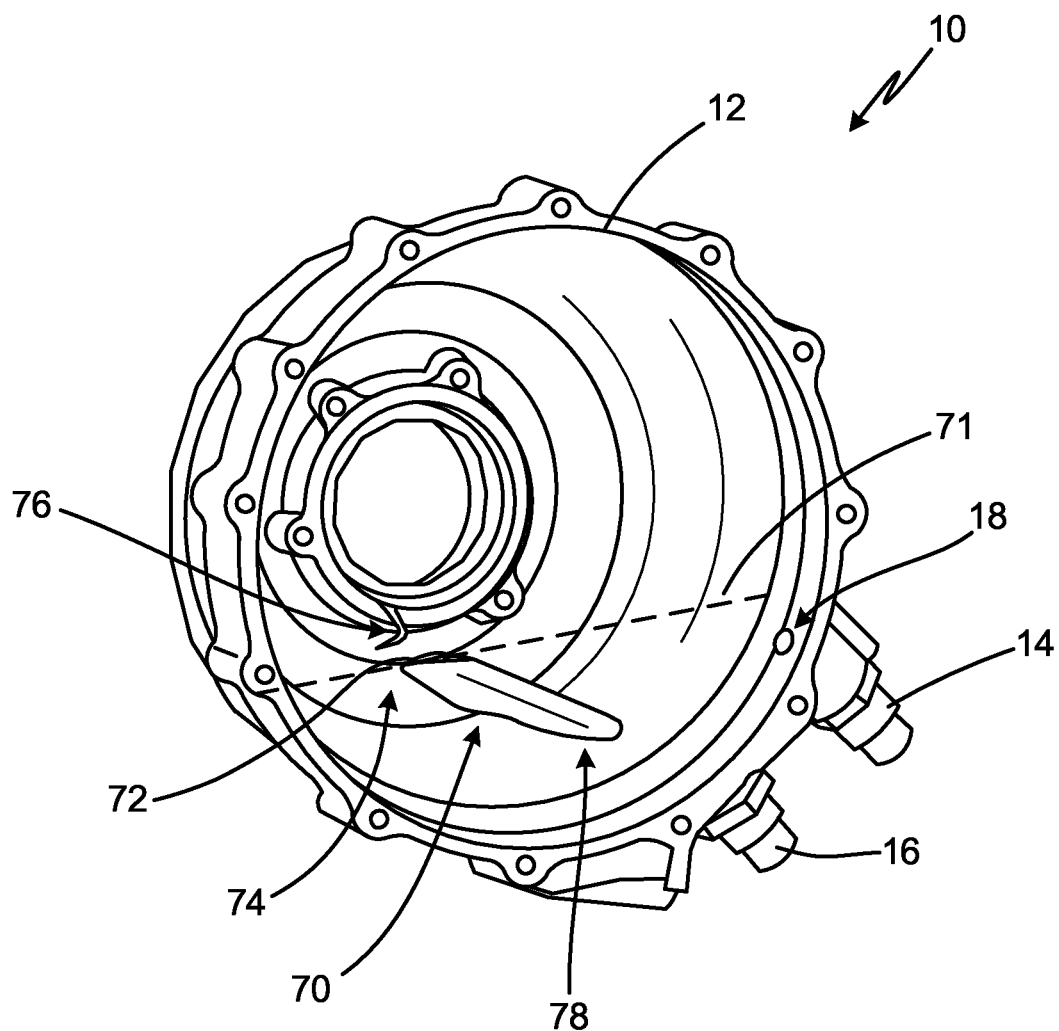
FIG. 3 is a perspective view of the interior of the starter showing a current standpipe assembly.

FIG. 3 shows a perspective view of the interior of starter 10 showing current, or existing, standpipe assembly 70 incorporated into housing 12. Current standpipe assembly 70 includes first opening 72 at first end 74 of elongated, tubular oil channel 76. At or near second end 78, current standpipe assembly 70 is fluidly connected to drain aperture 16 of starter 10. During servicing of starter 10, oil can be filled, injected, poured or loaded into starter 10 through fill aperture 14 and can flow through fill opening 18 in housing 12 and into the interior of housing 12. Once the oil level reaches its preferred maximum, or overfill amount, level or line 71, which is at or about even with opening 72 of standpipe 70, it flows through elongated, tubular oil channel 76 and exits housing 12 through drain aperture 16. A challenge with current standpipe assembly 70 may be that opening 72 and standpipe 70 do not provide enough cross-sectional area to provide rapid enough draining of oil out of housing 12, resulting in overfilling of starter 10. Another challenge with current standpipe assembly 70 may be that it extends nearly perpendicular to (and not parallel to) oil flow through starter 10 rotation during operation. Thus, current standpipe assembly 70 may interfere with oil flowing within starter 10 during its operation. Thus, a need still exists for an improved standpipe assembly that allows for sufficient draining of the starter during servicing to prevent overfilling, and that does not interfere with oil flow through the starter during operation.

Figure 4:
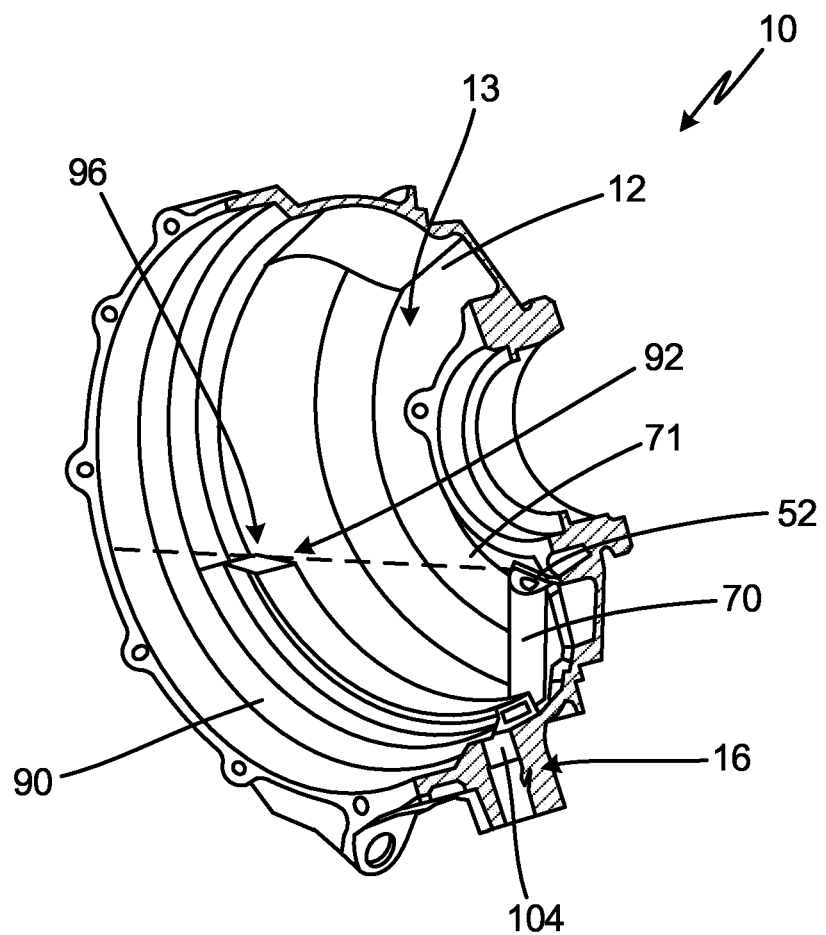
FIG. 4 is a perspective view of the starter with a portion of the starter's housing cut away for viewing a retrofit standpipe assembly for use with the current standpipe assembly of FIG. 3.

FIG. 4 is a perspective view of starter 10 with a portion of starter housing 12 cut away for viewing retrofit standpipe assembly 90 (a portion of which is only shown), which is shown retrofit onto current (or existing) standpipe assembly 70 of FIG. 3 (a portion of which is shown in FIG. 4). Retrofit standpipe assembly 90 fits within housing 12, adjacent inner surface 13 of housing 12, to assist current standpipe assembly 70 with draining oil that reaches overfill limit or level 71 during servicing. Retrofit standpipe assembly 90 provides a second or dual path for oil to flow out of starter 10. Retrofit standpipe assembly 90 is a separate component from starter 10, and fits within housing 12 using, for example, an interference fit or by a braze, etc. Geometry of retrofit standpipe assembly 90 can secure assembly 90 in place and prevents its rotation or undesired movement within starter 10 during operation. An interference fit may be used to secure retrofit standpipe assembly 90 in place in starter 10. Such an interference fit can, for example, be defined as any fit between two parts in which the external dimension of one part slightly exceeds the internal dimension of the part into which it has to fit. Retrofit standpipe assembly 90

Retrofit standpipe assembly 90 includes first and second ends 92, 94 (94 not shown in FIG. 4, but instead in FIG. 5), respectively, of elongated oil channel 96 (i.e., hollow passageway), through which oil may flow freely when starter 10 is running or operating. A cross-section of elongated oil channel 96 may be circular in shape, or any other non-standard shape, and such shape can be designed to fill the most space that exists between hosing 12 and a gear train component, which can maximize oil flow during servicing while minimizing disturbance during operation. First and second ends 92, 94, respectively, are aligned in parallel to oil flow during starter 10 operation such that the structure can provide little to no interference to internal oil flow and distribution during starter operation. During servicing of engine and starter 10, first end 92 is at or below overfill line 71 of starter 10. Second end 94 of elongated channel (or hollow passageway) 96 is also at or below overfill line 71 (see FIG. 5). Cylindrical drain 104 is located at or near drain aperture 16 of housing 12 through which oil may exit starter 10. Retrofit standpipe assembly 90 then serves as a second means for oil that reaches overfill line 71 to be channeled to exit starter 10 through drain aperture 16 in order to prevent overfilling. Retrofit standpipe assembly 90 increases the potential for oil to flow out of starter 10 by increasing the cross-sectional area through which oil may flow during servicing, thereby reducing the chance of overfilling. Elongated channel 96 has a cross-sectional area that is greater than at least a cross-sectional area of hollow passageway 76 of current standpipe assembly 70.

Figure 5:
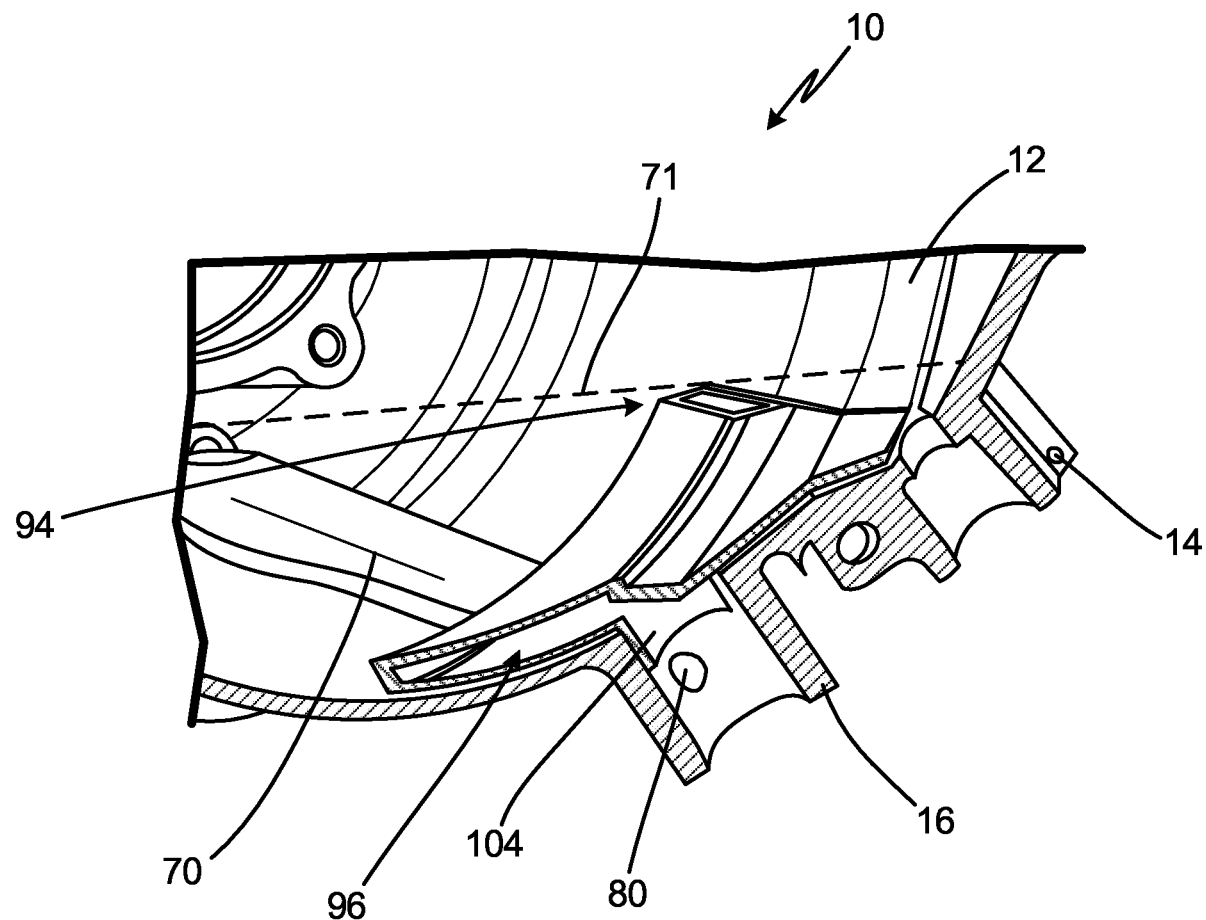
FIG. 5 is a close-up view a portion of the starter's housing cut away and a portion of the retrofit standpipe assembly of FIG. 4.

FIG. 5 is a close-up view a portion of starter 10 with housing 12 cut away and including a portion of retrofit standpipe assembly 10 of FIG. 4. FIG. 5 also includes a portion of current standpipe assembly 70. Second opening 80 of current standpipe assembly 70, which was not visible in FIG. 3, is shown. Second opening 80 opens into drain aperture 16 (shown with a portion cut away) and allows oil to empty into drain aperture 16 and exit starter 10, along with oil coming through channel 96 of retrofit standpipe assembly 90. FIG. 5 also shows second end 94 of elongated channel 96. Both first and second ends 92 (not shown), 94 allow oil to flow freely without restriction when starter 10 is operating. When starter is being serviced, elongated channel 96 allows for a second channel for oil overflow to exit starter 10.

FIGS. 6A-6C show a perspective view, a top view and a bottom view, respectively, of retrofit standpipe assembly 90, which can be curved in shape and formed to fit with or along, or be arranged adjacent, a portion of inner surface 13 of housing 12 (as shown in FIG. 4). Retrofit standpipe assembly 90 includes body portion 98 including elongated channel 96 having first end 92 and second end 94 through which oil can flow during servicing and/or operation of a starter into which retrofit standpipe assembly 90 is fit. Retrofit standpipe assembly 90 also can include interference fit lip 100 which can extend along first side 102 of body portion 98 and can allow retrofit standpipe assembly 90 to be held in place in starter 10 by interference fit lip 100 being retained by another portion or portions of starter 10, possibly during its assembly. Retrofit standpipe assembly 90 can also include a cylindrical drain 104, through which oil can flow from elongated channel 96. Cylindrical drain 104 extends through lower surface 106 of retrofit standpipe assembly 90, which is opposite upper surface 108. As can be seen in FIGS. 4 and 5, cylindrical drain 104 can extend from body portion 98 and can fit within drain aperture 16 of housing 12.

Figure 7:
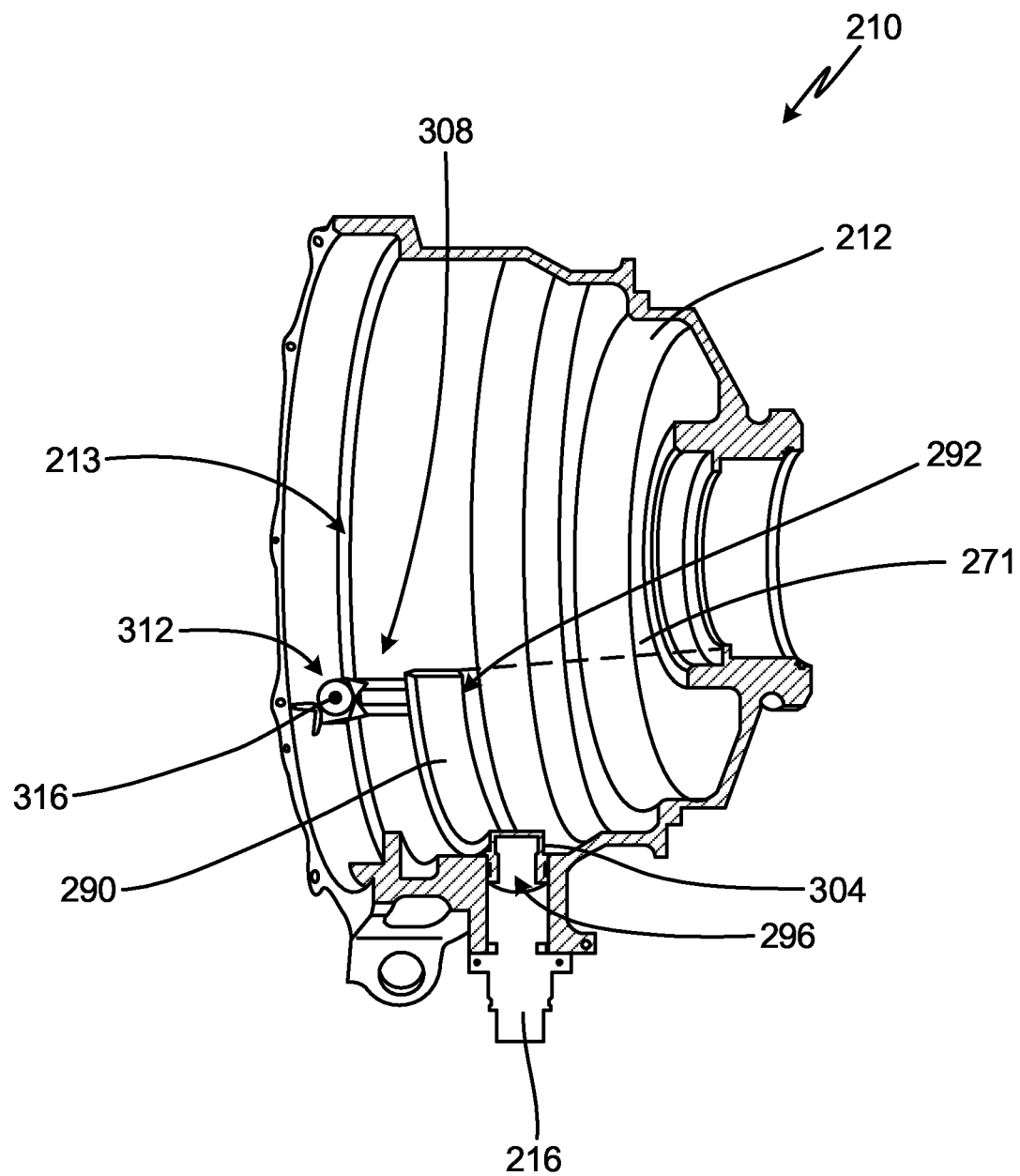
FIG. 7 is a perspective view of the starter with a portion of the starter's housing cut away for viewing a redesigned standpipe assembly.

FIG. 7 is a perspective view of starter 210 with a portion of housing 212 cut away for viewing redesigned standpipe assembly 290. Redesigned standpipe assembly 290 fits within housing 212, on inner surface 213 of housing 212, to drain oil that reaches overfill limit 271 during servicing of starter 210 in the field or elsewhere. Redesigned standpipe assembly 290 can be attached or connected to or within housing 212 using any suitable attachment means for attaching redesigned standpipe assembly 290 to housing 212. Redesigned standpipe assembly 290 includes first and second ends 292, 294, respectively, of elongated oil channel 296 (i.e., hollow passageway), through which oil may flow freely when starter 210 is running or operating. First and second ends 292, 294, respectively, are aligned in parallel to oil flow during starter 210 operation such that the structure can provide little to no interference to internal oil flow and distribution. During servicing of engine and starter 210, first end 292 is at or below overfill line 271 of starter 210. Second end 294 (not shown in FIG. 7 but in FIG. 8) of elongated channel 296 is at or below overfill line 271 as well. Cylindrical drain 304 is at or near drain aperture 216 of housing 212 through which oil may exit or drain out of starter 210. Redesigned standpipe assembly 290 provides a sufficient cross-sectional area in its elongated channel 296 for oil that reaches overfill line 271 to be channeled to exit starter 210 through drain aperture 216 in order to prevent overfilling.

Figure 8:
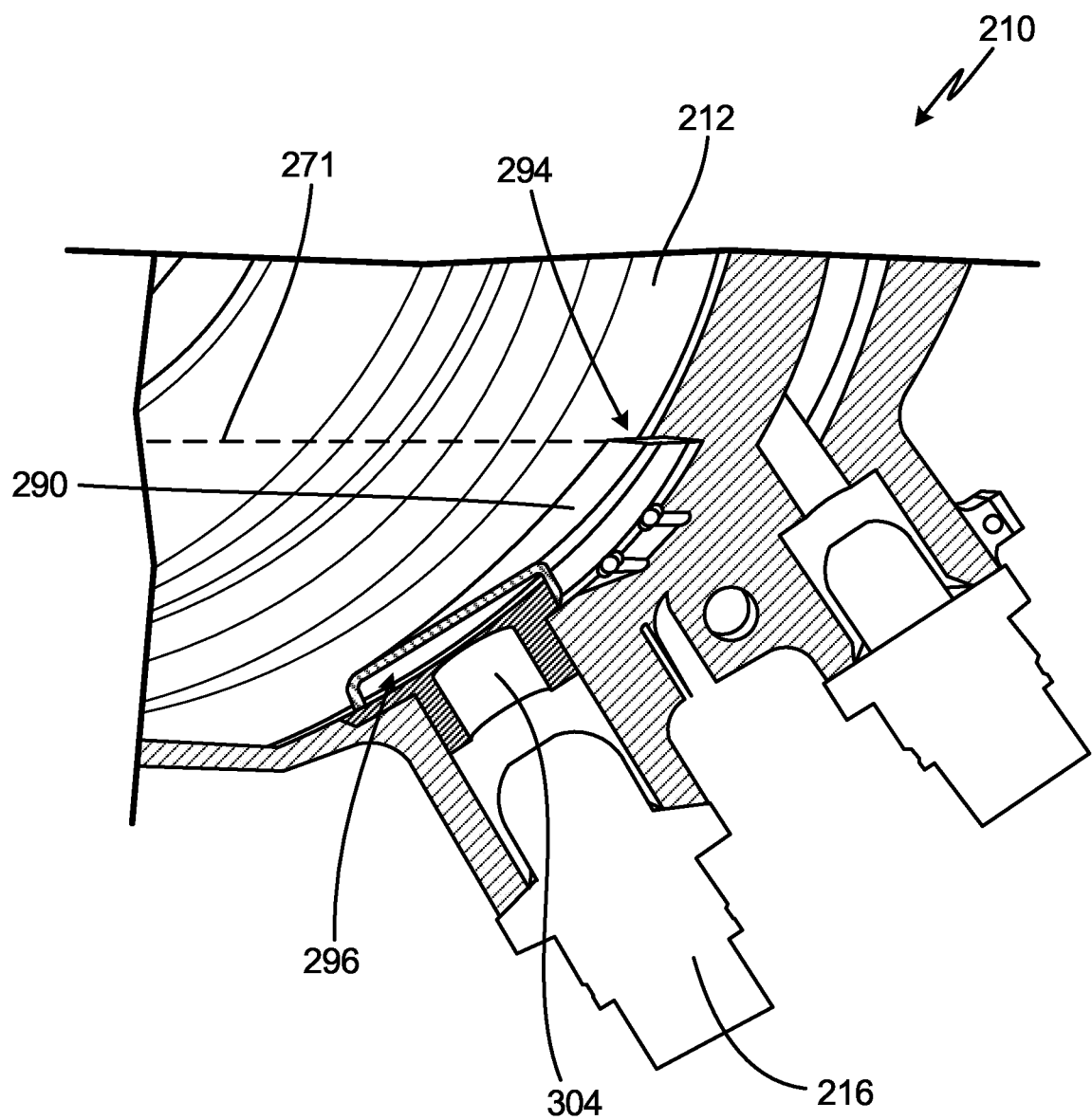
FIG. 8 is a close-up view of a portion of the starter's housing cut away and a portion of the redesigned standpipe assembly of FIG. 7.

FIG. 8 is a close-up view a portion of starter 210 with housing 212 cut away and including a portion of redesigned standpipe assembly 290 of FIG. 7. Cylindrical drain 304 can extend from redesigned standpipe assembly 290 and can fit within drain aperture 216 of housing 212.

FIGS. 9A-9C show a first perspective view, a top view and a second perspective view including a portion of the bottom of redesigned standpipe assembly 290, which can be curved and formed to fit along a portion of inner surface 213 of housing 212 (as shown in FIG. 7), respectively. Redesigned standpipe assembly 290 includes body portion 298 including elongated channel 296 having first end 292 and second end 294 through which oil can flow during servicing and/or operation of a starter into which redesigned standpipe assembly 290 is fit. Redesigned standpipe assembly 290 also can include, for example, first extension (i.e., first bracket) 308 and second extension (i.e., second bracket) 310 at or near opposite ends of redesigned standpipe assembly 290 that can allow redesigned standpipe assembly 290 to be held in place in starter 210. A screw or bolt, for example, may pass through first extension (or bracket) opening 312 and second extension (or bracket) opening 314 in order to secure redesigned standpipe assembly 290 to starter 210. Other suitable means for attaching redesigned standpipe assembly 290 to housing 212 are also contemplated, however. FIG. 7 shows screw or bolt 316 in opening 312 in first extension 308. Redesigned standpipe assembly 290 can also include cylindrical drain 304, through which oil can flow from elongated channel 296. Cylindrical drain 304 extends through lower surface 306 of redesigned standpipe assembly 290, which is opposite upper surface 307. As can be seen in FIGS. 7 and 8, cylindrical drain 304 can extend and fit within drain aperture 216 of housing 212.

Both retrofit standpipe assembly 90 and redesigned standpipe assembly 290 can be made by machining, by a cast process, and/or by additive manufacturing, for example. Any suitable material, such as a metal, a polymer, and/or a combination of both, can be used to form retrofit standpipe assembly 90 and redesigned standpipe assembly 290.

Figure 10:
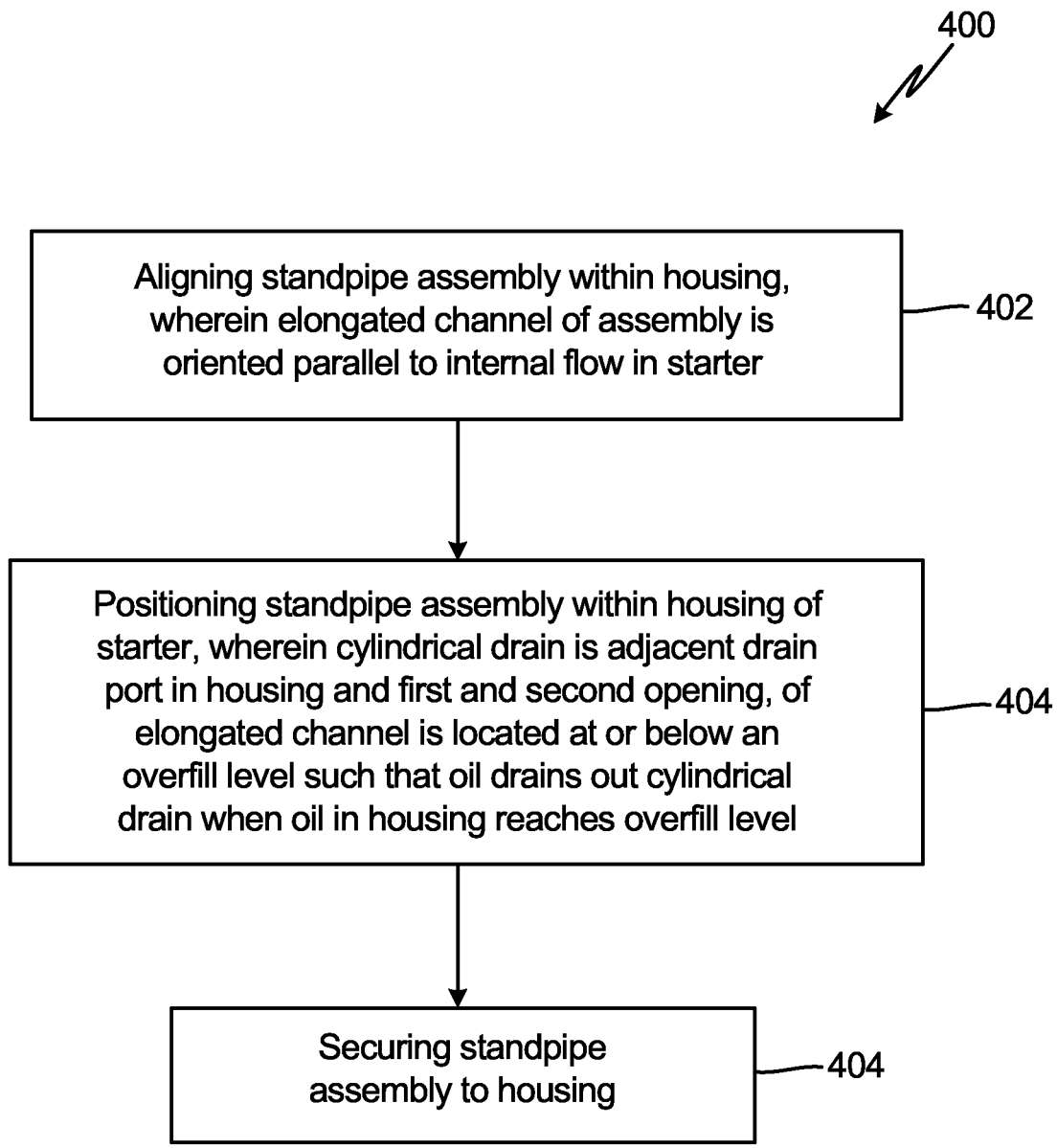
FIG. 10 is a block diagram of a method of installing a standpipe assembly in a starter.

FIG. 10 depicts a method 400 of installing a standpipe assembly, such as retrofit standpipe assembly 90 of FIGS. 6A-6C and/or redesigned standpipe assembly 290 of FIGS. 9A-9C, in a starter, such as starter 10 of FIG. 1 and/or starter 210 of FIG. 7. Starter 10 or 210 can include housing 12 or 212. Standpipe assembly 90 or 290 can comprise elongated channel 96 or 296 with first open end 94 or 294, and second open end 92 or 292. Block 402 includes a step of aligning standpipe assembly 90 or 290 within housing 12 or 212. Standpipe assembly 90 or 290 can be oriented in parallel to internal oil flow in starter 10 or 210 for example, to inhibit interference with internal oil flow during operation of starter 10 or 210. Block 404 includes a step of positioning standpipe assembly 90 or 290 within housing 12 or 212 of starter 10 or 210, wherein cylindrical drain 104 or 304 is adjacent drain aperture 16 or 216 in housing 12 or 212 and first opening 92 or 292 and second opening 92 or 292 are at an overfill level 71 or 271 such that oil drains through standpipe assembly 90 or 290 and out cylindrical drain 104 or 304 when oil in housing 12 or 212 reaches overfill line 71 or 271, or level, during servicing of starter 10 or 210. Block 406 includes a step of securing standpipe assembly 90 or 290 to housing 12 or 212. The securing step of block 406 can comprise using an interference fit within housing 12 or 212 to secure standpipe assembly 90 or 290. Alternatively, securing standpipe assembly 90 or 290 can comprise connecting one or more brackets of standpipe assembly 90 or 290 to housing 12 or 212 with one or more fasteners. Starter 10 may include current or existing standpipe assembly 70 such that retrofit standpipe assembly 90 provides a dual path for oil to exit starter 10 (along with the current standpipe assembly) during servicing once the oil level reaches overfill amount or overfill line 71.

Method 400 of installing the standpipe assembly can include retrofitting standpipe assembly 90 to housing 12 including existing standpipe assembly 70, in order to provide a dual path for oil to drain out of starter 10 when oil in housing 12 reaches overfill level 71 during servicing of starter 10.

Discussion of Possible Embodiments

The following are non-exclusive descriptions of possible embodiments of the present invention.

Assembly and associated methods relate to a standpipe assembly configured to connect to a starter that includes a housing. The standpipe assembly includes: a standpipe having first and second openings at opposite ends of a hollow passageway, wherein the standpipe, upon being connected to the starter, is oriented within the housing so that the standpipe drains oil through the standpipe when oil in the housing reaches an overfill level, and is oriented in parallel to internal oil flow in the starter to inhibit interference with the internal oil flow during operation of the starter; and an attachment portion, wherein the attachment portion is structured to attach the standpipe assembly to the housing of the starter and prevent movement of the standpipe assembly with respect to the housing of the starter.

The assembly of the preceding paragraph can optionally include, additionally and/or alternatively, any one or more of the following features, configurations and/or additional components:

A further embodiment of the foregoing assembly, wherein the attachment portion attaches the standpipe assembly to the housing using an interference fit.

A further embodiment of any of the foregoing assemblies, wherein the attachment portion comprises one or more brackets to attach the standpipe assembly to the housing with one or more fasteners.

A further embodiment of any of the foregoing assemblies, wherein the first opening of the standpipe, upon the standpipe being connected to the starter, is adjacent a gravity drain port in the housing and the second opening is at the overfill level such that oil drains through the hollow passageway and out the first opening when oil in the housing reaches the overfill level during servicing of the starter.

A further embodiment of any of the foregoing assemblies, wherein the housing includes a drain extending from a portion of the housing at the overfill level to the gravity drain port such that oil drains through the drain when oil in the housing reaches the overfill level during servicing of the starter.

A further embodiment of any of the foregoing assemblies, wherein the hollow passageway of the standpipe has a cross-sectional area that is greater than at least a cross-sectional area of the drain.

A further embodiment of any of the foregoing assemblies, wherein, upon the standpipe being connected to the starter, oil runs through the hollow passageway during operation of the starter and out a gravity drain port in the housing adjacent a first opening of the standpipe.

Some embodiments relate to a starter. The starter includes: a housing that includes a first aperture to receive oil and a second aperture to allow the oil to flow out of the housing; and a standpipe assembly comprising: a standpipe having first and second openings at opposite ends of a hollow passageway, wherein the standpipe, upon being connected to the starter, is oriented within the housing so that the standpipe drains oil through the standpipe and the second aperture of the housing when oil in the housing reaches an overfill level, and is oriented in parallel to internal oil flow in the starter to inhibit interference with the internal oil flow during operation of the starter; and an attachment portion, wherein the attachment portion is structured to attach the standpipe assembly to the housing and prevent movement of the standpipe assembly The starter of the preceding paragraph can optionally include, additionally and/or alternatively, any one or more of the following features, configurations and/or additional components:

A further embodiment of the foregoing starter, wherein the attachment portion attaches the standpipe assembly to the housing using an interference fit.

A further embodiment of any of the foregoing starters, wherein the standpipe assembly is attached to the housing of the starter that also includes an existing standpipe assembly, such that the standpipe assembly provides a dual path for oil to drain out of starter when oil in the housing reaches the overfill level during servicing of the starter.

A further embodiment of any of the foregoing starters, wherein the attachment portion comprises one or more brackets to attach the standpipe assembly to the housing with one or more fasteners.

A further embodiment of any of the foregoing starters, wherein the first opening of the standpipe, upon the standpipe being connected to the starter, is adjacent the second aperture of the housing and the second opening is at the overfill level such that oil drains through the hollow passageway and out the first opening when oil in the housing reaches the overfill level during servicing of the starter.

A further embodiment of any of the foregoing starters, wherein, upon the standpipe being connected to the starter, oil runs through the hollow passageway during operation of the starter and out the second aperture of the housing adjacent a first opening of the standpipe.

A further embodiment of any of the foregoing starters, wherein the housing includes a drain extending from a portion of the housing at the overfill level to the gravity drain port such that oil drains through the drain when oil in the housing reaches the overfill level during servicing of the starter.

A further embodiment of any of the foregoing starters, wherein the hollow passageway of the standpipe has a cross-sectional area that is greater than at least a cross-sectional area of the drain.

Some embodiments relate to a method of installing a standpipe assembly in a starter including a housing. The standpipe assembly comprises a hollow passageway having first and second openings at opposite ends and a drain, the method comprising: aligning the standpipe assembly within the housing, wherein the hollow passageway is oriented in parallel to internal oil flow in the starter to inhibit interference with the internal oil flow during operation of the starter; positioning the standpipe assembly within the housing of the starter, wherein the drain of the standpipe is adjacent a gravity drain port in the housing and the first opening and second opening are located at or below an overfill level such that oil drains through the standpipe and out the drain when oil in the housing reaches the overfill level during servicing of the starter; and securing the standpipe assembly to the housing.

The method of the preceding paragraph can optionally include, additionally and/or alternatively, any one or more of the following steps, features, configurations and/or additional components:

A further embodiment of the foregoing method, wherein securing the standpipe assembly comprises using an interference fit with the housing to secure the standpipe assembly.

A further embodiment of any of the foregoing methods, wherein securing the standpipe assembly comprises connecting one or more brackets of the standpipe assembly to the housing with one or more fasteners.

A further embodiment of any of the foregoing methods, wherein the method of installing the standpipe assembly includes retrofitting the standpipe assembly to the housing, which also includes an existing standpipe assembly, in order to provide a dual path for oil to drain out of starter when oil in the housing reaches the overfill level during servicing of the starter.

A further embodiment of any of the foregoing methods, wherein the starter housing includes a drain extending from a portion of the housing at the overfill level to the gravity drain port such that oil drains through the drain when oil in the housing reaches the overfill level during servicing of the starter.

It should be understood that like reference numerals identify corresponding or similar elements throughout several drawings. It should be understood that although a particular component arrangement is disclosed in the illustrated embodiments, other arrangement will benefit therefrom.

Although particular step sequences are shown, described and claimed, it should be understood that steps may be performed in any order, separate or combined unless otherwise indicated and will still benefit from the present disclosure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A standpipe assembly configured to connect to a starter that includes a housing, the standpipe assembly comprising:
   a standpipe having first and second openings at opposite ends of a hollow passageway, wherein the standpipe, upon being connected to the starter, is oriented within the housing so that the standpipe drains oil through the standpipe when oil in the housing reaches an overfill level, and is curved to extend circumferentially along and adjacent to an inner surface of the housing to inhibit interference with the internal oil flow during operation of the starter; and
   an attachment portion, wherein the attachment portion is structured to attach the standpipe assembly to the housing of the starter and prevent movement of the standpipe assembly with respect to the housing of the starter.

2. The standpipe assembly of claim 1, wherein the attachment portion attaches the standpipe assembly to the housing using an interference fit.

3. The standpipe assembly of claim 1, wherein the attachment portion comprises one or more brackets to attach the standpipe assembly to the housing with one or more fasteners.

4. The standpipe assembly of claim 1, wherein the first opening of the standpipe, upon the standpipe being connected to the starter, is adjacent a gravity drain port in the housing and the second opening is at the overfill level such that oil drains through the hollow passageway and out the first opening when oil in the housing reaches the overfill level during servicing of the starter.

5. The standpipe assembly of claim 1, wherein the housing includes a drain extending from a portion of the housing at the overfill level to the gravity drain port such that oil drains through the drain when oil in the housing reaches the overfill level during servicing of the starter.

6. The standpipe assembly of claim 5, wherein the hollow passageway of the standpipe has a cross-sectional area that is greater than at least a cross-sectional area of the drain.

7. The standpipe assembly of claim 1, wherein, upon the standpipe being connected to the starter, oil runs through the hollow passageway during operation of the starter and out a gravity drain port in the housing adjacent a first opening of the standpipe.

8. A starter comprising:
   a housing that includes an inner surface that extends along a circumference of the housing, a first aperture to receive oil and a second aperture to allow the oil to flow out of the housing; and
   a standpipe assembly comprising:
      a standpipe having first and second openings at opposite ends of a hollow passageway, wherein the standpipe, upon being connected to the starter, is oriented within the housing so that the standpipe drains oil through the standpipe and the second aperture of the housing when oil in the housing reaches an overfill level, and is curved and extends circumferentially along and against the inner surface of the housing and
      an attachment portion, wherein the attachment portion is structured to attach the standpipe assembly to the housing and prevent movement of the standpipe assembly.

9. The starter of claim 8, wherein the attachment portion attaches the standpipe assembly to the housing using an interference fit.

10. The starter of claim 8, wherein the standpipe assembly is attached to the housing of the starter that also includes an existing standpipe assembly, such that the standpipe assembly provides a dual path for oil to drain out of starter when oil in the housing reaches the overfill level during servicing of the starter.

11. The starter of claim 8, wherein the attachment portion comprises one or more brackets to attach the standpipe assembly to the housing with one or more fasteners.

12. The starter of claim 8, wherein the first opening of the standpipe, upon the standpipe being connected to the starter, is adjacent the second aperture of the housing and the second opening is at the overfill level such that oil drains through the hollow passageway and out the first opening when oil in the housing reaches the overfill level during servicing of the starter.

13. The starter of claim 8, wherein, upon the standpipe being connected to the starter, oil runs through the hollow passageway during operation of the starter and out the second aperture of the housing adjacent a first opening of the standpipe.

14. The starter of claim 8, wherein the housing includes a drain extending from a portion of the housing at the overfill level to the gravity drain port such that oil drains through the drain when oil in the housing reaches the overfill level during servicing of the starter.

15. The starter of claim 14, wherein the hollow passageway of the standpipe has a cross-sectional area that is greater than at least a cross-sectional area of the drain.

16. A method of installing a standpipe assembly in a starter including a housing, the standpipe assembly comprising a hollow passageway having first and second openings at opposite ends and a drain, the method comprising:

aligning the standpipe assembly within the housing, wherein the hollow passageway is curved and extends circumferentially along and adjacent to an inner surface of the housing to inhibit interference with the internal oil flow during operation of the starter;

positioning the standpipe assembly within the housing of the starter, wherein the drain of the standpipe is adjacent a gravity drain port in the housing and the first opening and second opening are located at or below an overfill level such that oil drains through the standpipe and out the drain when oil in the housing reaches the overfill level during servicing of the starter; and securing the standpipe assembly to the housing.

17. The method of claim 16, wherein securing the standpipe assembly comprises using an interference fit with the housing to secure the standpipe assembly.

18. The method of claim 16, wherein securing the standpipe assembly comprises connecting one or more brackets of the standpipe assembly to the housing with one or more fasteners.

19. The method of claim 16, wherein the method of installing the standpipe assembly includes retrofitting the standpipe assembly to the housing, which also includes an existing standpipe assembly, in order to provide a dual path for oil to drain out of starter when oil in the housing reaches the overfill level during servicing of the starter.

20. The method of claim 16, wherein the starter housing includes a drain extending from a portion of the housing at the overfill level to the gravity drain port such that oil drains through the drain when oil in the housing reaches the overfill level during servicing of the starter.

\* \* \* \* \*